Jan. 11, 1927.

R. L. DAILEY 1,613,646

SELECTIVE POWER TRANSMISSION

Filed June 24, 1925      4 Sheets-Sheet 1

Jan. 11, 1927.  R. L. DAILEY  1,613,646
SELECTIVE POWER TRANSMISSION
Filed June 24, 1925   4 Sheets-Sheet 3

Witness:
R. E. Hamilton

Inventor,
Russell L. Dailey,
By Thorpe & Gerard,
his Attorneys.

Jan. 11, 1927. 1,613,646

R. L. DAILEY

SELECTIVE POWER TRANSMISSION

Filed June 24, 1925 4 Sheets-Sheet 4

Witness:
R. C. Hamilton

Inventor
Russell L. Dailey,
By Thorpe & Gerard
his Attorneys

Patented Jan. 11, 1927.

1,613,646

UNITED STATES PATENT OFFICE.

RUSSELL L. DAILEY, OF KANSAS CITY, MISSOURI.

SELECTIVE POWER TRANSMISSION.

Application filed June 24, 1925. Serial No. 39,289.

The present invention relates to power transmission apparatus, and aims to provide a novel construction of this character adapted to utilize relatively small mechanical effort and transmit the same with multiplied effect to the point or points where the power is consumed or work done.

It is a special object to devise a construction especially adapted for self propelled vehicles, and to embody certain elements of the improved transmission in the tractor wheels of the vehicle, the mechanism being also so arranged as to accommodate any differential movement of said wheels.

It is also an important object of the improved construction to make provision for selective control of the transmission so as to conveniently vary the degree of mechanical effort exerted, through the train of gearing, upon the traction wheels, and the resultant rate of travel of the same, or for varying the power required to carry the load.

It is a further object of the invention to provide a construction in which the control of the transmission may be conveniently carried out without the usual gear shift devices, and in which the operation of the transmission may be readily reversed at will.

Another feature of the improved construction is the reduction of the dead weight of the usual form of transmission devices to practically a minimum.

It is further sought to provide an apparatus of this character which will be of comparatively simple but strong and durable construction, of an extremely smooth-running type, easily operated and of a nature not likely to get out of order.

With these general objects in view, the invention will now be described by reference to the accompanying drawings illustrating one form of construction which has been devised for carrying the same into practice, after which those features and combinations deemed to be novel will be particularly set forth and claimed.

In the drawings—

Figure 4:
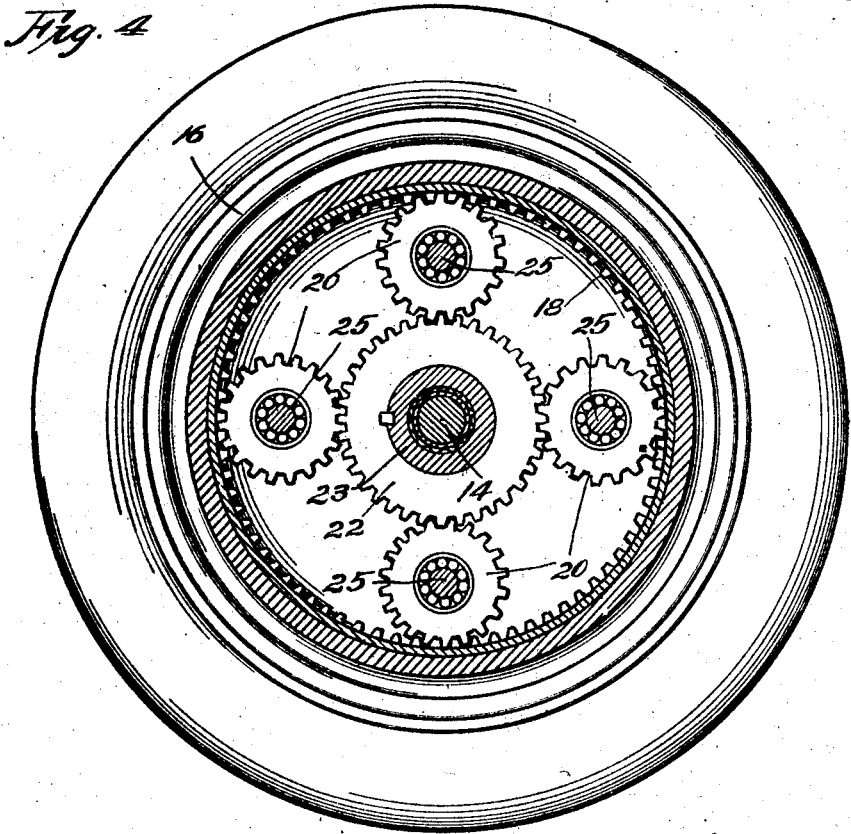

Referring now to the drawings in detail, these illustrate the improved transmission construction in connection with the traction or propelling wheels of a vehicle, of which a portion of the chassis frame 10 is shown, said frame being underslung with reference to the rear axle housing sections 12. Each rear axle section 14 has keyed thereto, as indicated at 15, a traction wheel 16 (see Figure 2). Secured within the frame of each wheel 16, as by a press fit, and also pinned if desired (as indicated at 17), is an internal gear 18 meshing with a set of four pinion gears 20 (see Figure 4) which in turn mesh with a gear 22 keyed to a sleeve 23 journaled on the corresponding axle 14. The gears 20 are journaled on short stub shafts 25 carried by a disk wheel 27, which is in turn journaled on the sleeve 23 between the gear 22 and another gear 28 of the same size as the gear 22, formed on the inner end of said sleeve (see Figure 2).

Figure 2:
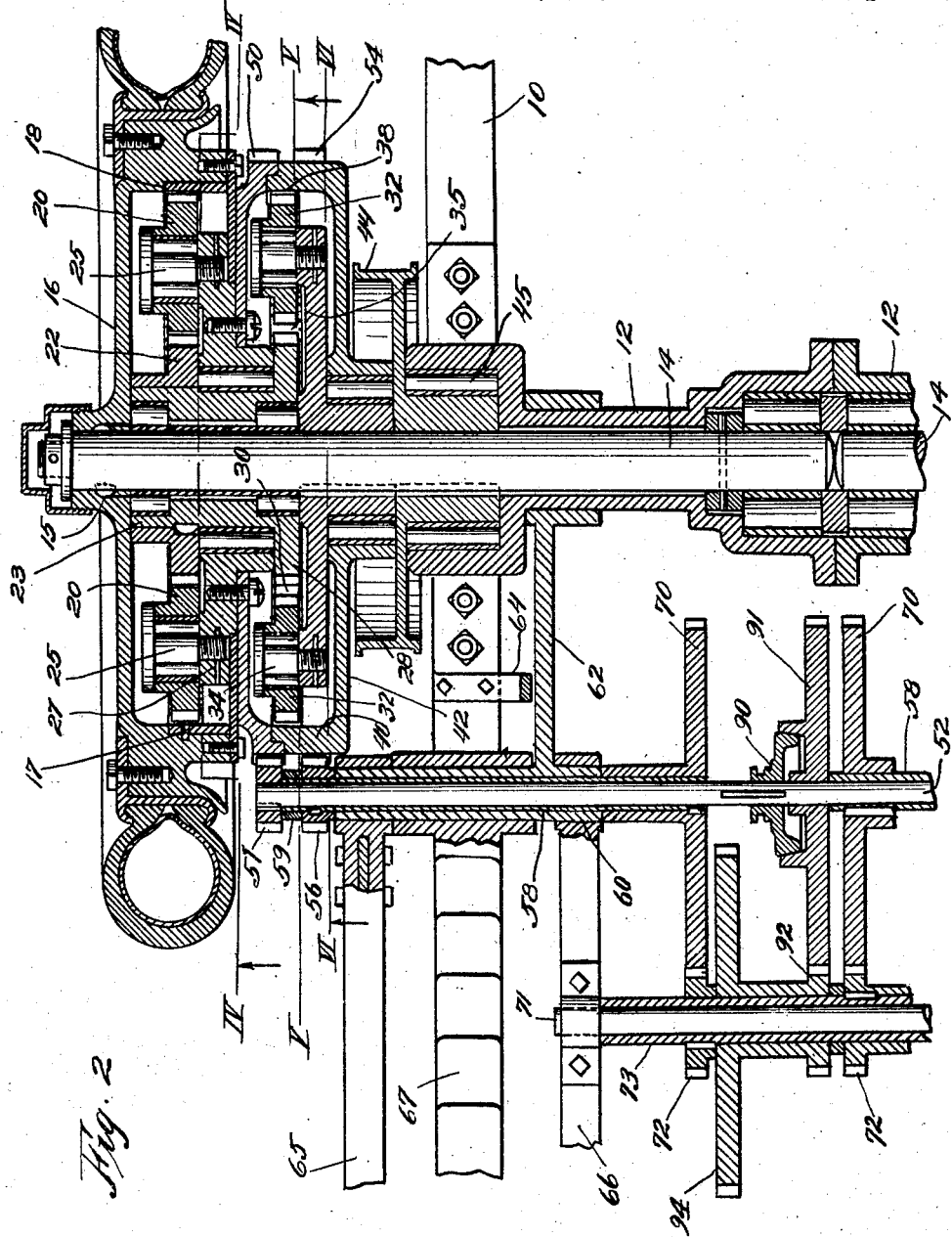
Figure 2 is an enlarged sectional plan view, representing a section taken on the line II—II of Figure 3.
Figure 6:
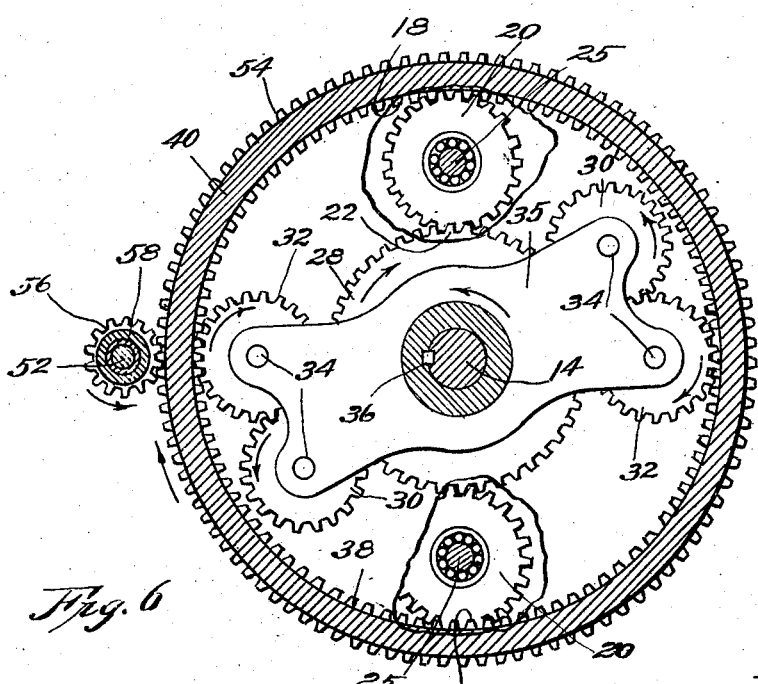
Figures 4, 5 and 6 are vertical sectional views taken on the lines IV—IV, V—V and VI—VI, respectively, of Figure 2, but on larger scales.
Figure 5:
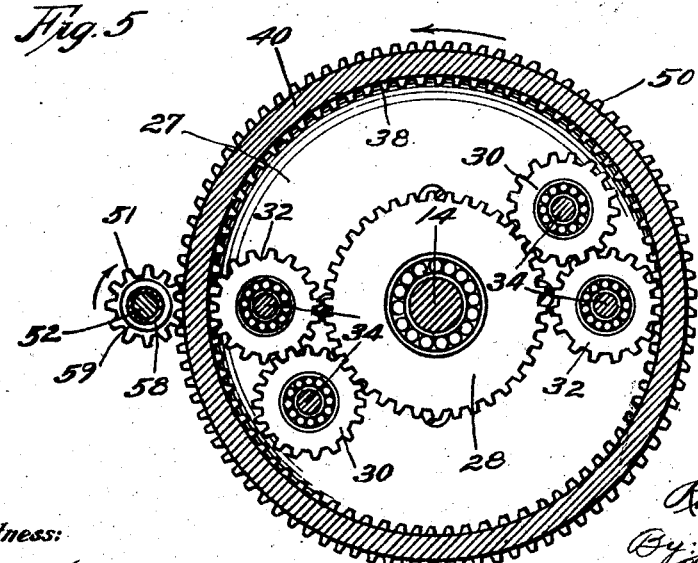

Referring now to Figures 2, 5 and 6, the gear 28 is geared to a set of reversing gear pinions comprising a pair of gears 30 meshing with said gear 28 at diametrically opposite points, the gears 30 in turn meshing with gears 32 of the same size, both sets of the gears 30 and 32 being journaled upon short stub shafts 34 carried by a plate member 35 which is keyed (as indicated at 36) to the corresponding axle 14. The gears 32 are meshed with an internal ring gear 38 formed on the flange portion 40 of a disk wheel 42 which is journaled upon the hub of the member 35, as illustrated in Figure 2.

Adjacent to each wheel 42 is located a brake member 44 keyed to the corresponding axle 14, and provided with rollers 45 between the hub of the brake member and the end of the corresponding housing member 12. Each of the rotating parts above described is also equipped with roller bearings, as illustrated in Figure 2.

To the disk wheel 27 is secured an external ring gear 50 meshing with a drive pinion 51 on one end of a shaft 52, and the disk wheel 42 is provided with a ring gear portion 54 of the same size as the gear 50 and meshing with a drive pinion 56 of the same size as the pinion 51 and secured to the end of a tubular shaft 58 sleeved upon the shaft 52. The gear pinions 51 and 56 are spaced slightly apart by a collar 59 on the shaft 58.

Figure 1:
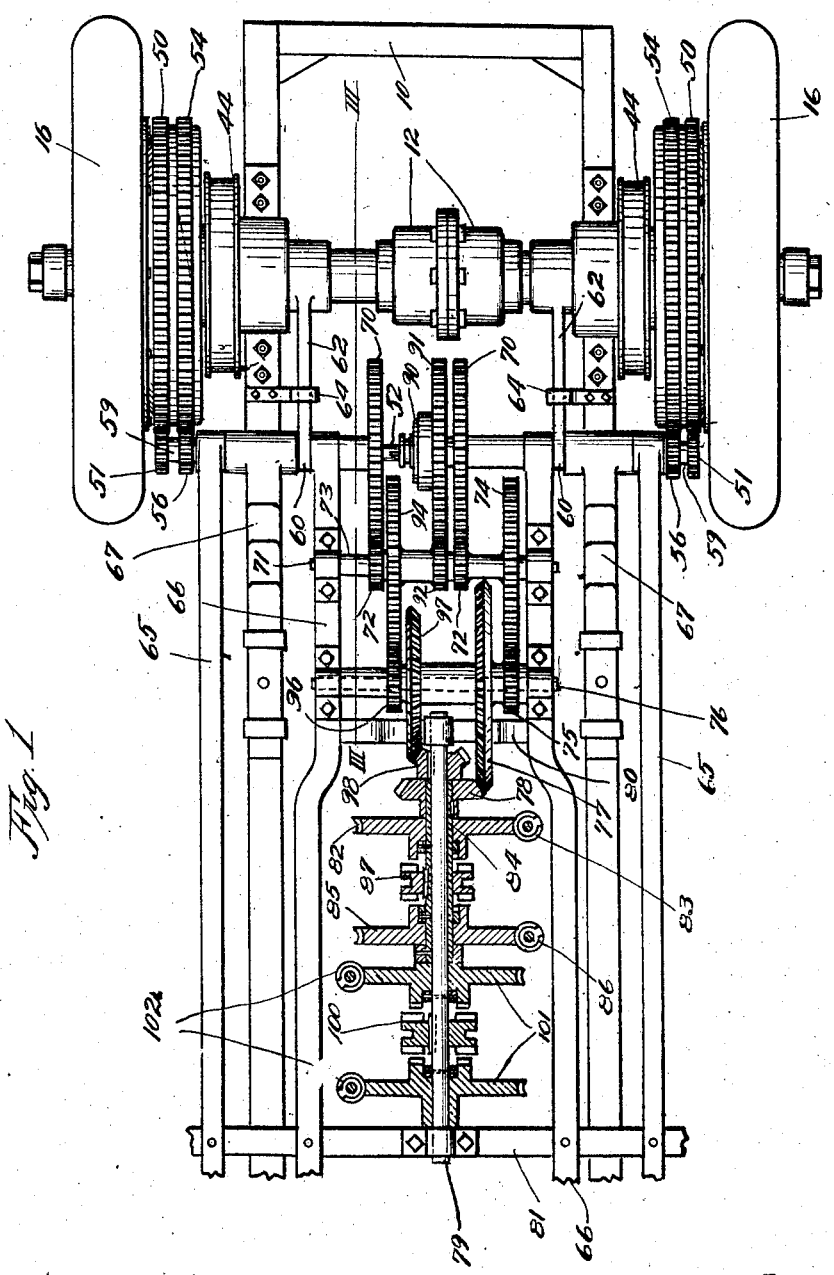
Figure 1 is a plan view illustrating a portion of a chassis of a self propelled vehicle, equipped with a transmission apparatus constructed in accordance with the present invention.
Figure 3:
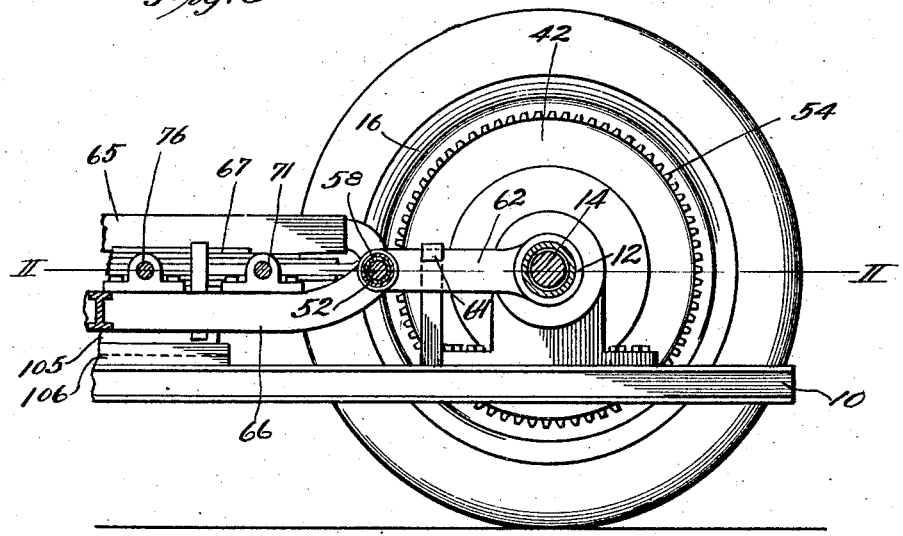
Figure 3 is a sectional elevation representing a vertical section taken on the line III—III of Figure 1.

Referring now to Figures 1 to 3, the tubular shafts 58 are carried in bearing sleeves 60 supported by arms 62 journaled upon the housing section 12, thus permitting a slight raising and lowering movement of the shafts 52 and 58, as hereinafter referred to, the upward movement of these arms 62 being limited by stop brackets 64 mounted at opposite sides of the frame 10. Journaled upon the sleeve bearing 60 are the rear ends of the chassis frame members 65 and 66 and also the rear end of each of the spring members 67, which serve to support the load of the body to be mounted upon the chassis.

To the inner end of each of the tubular shafts 58 is keyed a gear wheel 70 driven by relatively smaller drive pinions 72 keyed to a transverse sleeve 73 journaled on a transverse shaft 71 carried by the frame members 66. One of the drive pinions 72 is rigid with a relatively larger gear wheel 74 driven by a drive pinion 75 carried by a transverse shaft 76 supported by the frame members 66 and also fast to a bevel gear wheel 77 driven from a bevel gear pinion 78 secured to a sleeve 84 carried by a longitudinal shaft 79 supported in bearings on the transverse frame pieces 80 and 81 (see Figure 1). In order to enable the train of gearing just described to be driven in either direction, a pair of worm wheels 82 and 85 are journaled on the sleeve 84, adapted to be driven by worm elements 83 and 86 respectively, in opposite directions. These worm elements 83 and 86 may be operated either manually or from a motor drive, as preferred. Mounted between the worm gears 82 and 85 is a shiftable clutch member 87, keyed to the sleeve 84 carrying the bevel gear pinion 78, for driving the latter in either direction.

For driving the shaft 52, the same is provided with a shiftable clutch member 90 keyed to said shaft and adapted to be thrown into or out of clutched relation with a gear wheel 91 loosely mounted upon said shaft 52, and meshing with a drive gear 92 journaled upon the sleeve 73 carried by the shaft 71, and fast to a gear wheel 94. This gear wheel 94 in turn is driven by a gear pinion 96 (see Figure 1) which is rigid with a bevel gear wheel 97 on the shaft 76, and meshes with a bevel drive pinion 98 keyed to the shaft 79. To this shaft 79 is also keyed a clutch member 100 shiftable into engagement with either of a pair of worm gears 101 designed to be operated by a pair of worm elements 102 in opposite directions (as in the case of the worm elements 83 and 86), thereby operating the shaft 79 in either direction, and correspondingly driving the shaft 52, in an obvious manner.

Briefly stated, the operation of the above described transmission mechanism may be explained as follows. The driving force is initially applied to one or the other of the drive worms 102 according to the direction in which it is proposed to drive the traction wheels 16, the clutch member 100 being shifted accordingly. This force is accordingly multiplied through the medium of the train of gearing between said driving worms 102 and the gear pinions 51. Now any appropriate ratio of gears may be selected for the gearing within the wheel 16, as for example, in the case of 10" gears 23 and 28, I may use 5" gears 20 and 4" gears 30 and 32; in that case, it is obvious that for each revolution of the wheels 16, the 10" gears will each turn through two complete revolutions, while the 5" and 4" wheels will rotate four and five times, respectively. If the drive force is applied in a direction tending to rotate the drive pinions 51 in the direction indicated by the arrow adjacent to said pinion in Figure 5, the first effect will be to elevate the arms 62 into engagement with the stop brackets 64. For the framework which carried the shaft 52 is attached to the springs 67, also carries the vehicle load, and hence this shaft and connected parts will be normally depressed below the position shown in Figure 3 before the driving operation is initiated; but, upon application of the driving force, the gears 51 will ride upon the ring gears 50 until the arms 62 engage the stop elements 64, with the shaft 52 on a level with the axles 14. The longitudinal movement of the frame parts incident to this action is accommodated and guided by the provision of guide fins 105 depending from the spring assemblies 67 and operating in guideways 106, which prevent any undue lateral motion of the framework.

Now, after engagement of the arms 62 with the stop brackets 64, the driving force will tend to rotate the disk wheels 27, and hence the wheels 16 through the medium of the gears 20 and 18, in a counterclockwise direction, or in the direction of forward travel of the wheels 16 in which action the other train of gearing leading from the pinions 56 serves to hold said gears 18 and 20 meshed together in locked relation as regards any individual rotation of the gears 20 except as produced or permitted by said other train of gearing. If now a driving action is applied through the other train of gearing from one of the drive worms 83 or 86, to drive the gears 56, say in the direction of the arrow adjacent to the gear pinion 56 in Figure 6, to correspond to the forward driving action now being described, this will have the effect of tending to rotate the remaining parts in said view in the directions indicated by the several remaining arrows therein. Looking at Figures 5 and 6, this results in a drive force being exerted on the members 35, carrying the pinions 30 and 32, in a counterclockwise direction, and since the members 35 are keyed to the axles 14, this tends to produce forward travel of the wheels 16. The object of the reversing gears 30 and 32 is now apparent, since the driving action must tend to rotate the gears 28 in the same direction as the movement being imparted to the gears 22 connected thereto. With the driving force to the gear pinions 56 being maintained, the operation will then be to supplement the driving operation obtained through the shaft 52, since the force applied to the gears 28 simply reinforces the driving force operating through the gears 22 and hence through the gears 18 and 20 through which the drive is transmitted to the wheels 16. The drive force can be increased or multiplied easily to any desired extent for modifying the rate of movement of the wheels, as well as the degree of power required according to the load, as for traveling upgrade. Obviously also the arrangement of the described train of gearing takes care of any differentiating movement required to be provided for in traction wheels of this type, the clutch 90 being operated if necessary to release one train of drive gearing, and thus enabling the vehicle to turn corners without any interference due to different rates of movement of the wheels. Any desired form or type of brake may be provided for application to the brake members 44 shown in Figures 1 and 2.

While I have illustrated and described what I now regard as the preferred form of the construction for embodying the proposed improved transmission mechanism, I desire to reserve the right to make all such changes and modifications as may fairly fall within the scope of the appended claims.

What I claim is:

1. In a selective power transmission, an axle, a traction wheel keyed to said axle and provided with an internal ring gear, a pair of connected gears journaled on said axle, a disk operating about the axis of said axle and carrying a plurality of intermediate gears meshing with said ring gear and one of said other gears, a second internal ring gear operating about the axis of said wheel, a supporting member keyed to the axle and carrying reversing gears intermediate said second ring gear and the other of said pair of gears, and drive gearing for actuating said second ring gear.

2. In a selective power transmission, an axle, a traction wheel keyed to said axle and provided with an internal ring gear, a pair of connected gears journaled on said axle, a disk operating about the axis of said axle and carrying a plurality of intermediate gears meshing with said ring gear and one of said other gears, a second internal ring gear operating about the axis of said wheel, a supporting member keyed to the axle and carrying reversing gears intermediate said second ring gear and the other of said pair of gears, and separate drive gearing for independently actuating said disk and said second ring gear, respectively.

3. In a selective power transmission, an axle, a traction wheel keyed to said axle and provided with an internal ring gear, a pair of similar relatively fixed gears journaled on said axle, a disk journaled between said gears for free rotative movement about the axis of said axle, a plurality of intermediate gears carried by said disk in mesh with said ring gear and one of said pair of gears, an external ring gear secured to said disk, a second external ring gear operating about the axis of said axle and formed with an internal gear portion, a supporting member keyed to the axle and carrying reversing gears intermediate said internal gear portion and the other of said pair of gears, and separate drive pinions meshing with said external ring gears for independently actuating the same.

4. In a selective power transmission, an axle, a traction wheel keyed to said axle and provided with an internal ring gear, a pair of connected gears journaled on said axle, a disk operating about the axis of said axle and carrying a plurality of intermediate gears meshing with said ring gear and one of said other gears, a second internal ring gear operating about the axis of said wheel and formed with an external ring gear, a supporting member keyed to the axle and carrying reversing gears intermediate said ring gear and the other of said pair of gears, a drive pinion meshing with said external ring gear, and means for yieldingly supporting said drive pinion for bodily movement about the axis of said axle.

5. In a selective power transmission, an axle, a traction wheel keyed to said axle and provided with an internal ring gear, a pair of similar relatively fixed gears journaled on said axle, a disk journaled between said gears for free rotative movement about the axis of said axle, a plurality of intermediate gears carried by said disk in mesh with said ring gear and one of said pair of gears, an external ring gear secured to said disk, a second external ring gear operating about the axis of said axle and formed with an internal gear portion, a supporting member keyed to the axle and carrying reversing gears intermediate said internal gear portion and the other of said pair of gears, separate drive pinions meshing with said external ring gears for independently actuating the same, and means for yieldingly supporting said drive pinions for bodily movement about the axis of said axle.

In witness whereof I hereunto affix my signature.

RUSSELL L. DAILEY.